United States Patent [19]

Izawa et al.

[11] Patent Number: 4,890,037
[45] Date of Patent: Dec. 26, 1989

[54] APPARATUS FOR CONTROLLING A VEHICLE HEADLAMP

[75] Inventors: Minoru Izawa; Tadanao Hamamoto; Masaru Ishikawa; Harumi Dohke; Tasuku Nakano, all of Aichi, Japan

[73] Assignees: Toyota Jidosha Kabushiki Kaisha; Kabushiki Kaisha Tokai Rika Denki Seisakusho, both of Aichi, Japan

[21] Appl. No.: 281,895

[22] Filed: Dec. 5, 1988

Related U.S. Application Data

[63] Continuation-in-part of Ser. No. 945,548, Dec. 23, 1986, abandoned.

[30] Foreign Application Priority Data

Dec. 23, 1985 [JP]   Japan ................................ 60-198188

[51] Int. Cl.$^4$ ............................................. B60Q 1/02
[52] U.S. Cl. ........................................ 315/77; 315/82; 315/83; 315/158
[58] Field of Search ................... 315/77, 158, 82, 83, 315/78, 79, 80; 307/10 LS, 10 R

[56] References Cited

U.S. PATENT DOCUMENTS

| | | | |
|---|---|---|---|
| 3,256,463 | 6/1966 | Davis | 315/158 |
| 3,628,085 | 12/1971 | Brock | 315/82 |
| 3,743,886 | 7/1973 | Cretien | 315/158 |
| 4,208,615 | 6/1980 | Jones et al. | 315/83 |
| 4,301,390 | 11/1981 | Earle | 315/82 |

FOREIGN PATENT DOCUMENTS 184512  10/1983  Japan .

Primary Examiner—Leo H. Boudreau
Assistant Examiner—Michael Razavi
Attorney, Agent, or Firm—Finnegan, Henderson, Farabow, Garrett and Dunner

[57] ABSTRACT

The present invention utilizes a dimmer switch for alternating the lighting direction of a vehicle headlamp, but does so utilizing control apparatus that ensures that only low beam-directed light is emitted by the headlamp when the headlamp is turned ON. The possiblity which might be presented if oncoming traffic is suddenly met with high beam-directed light when an automobile driver turns his headlamps ON is thereby averted.

7 Claims, 3 Drawing Sheets

APPARATUS FOR CONTROLLING A VEHICLE HEADLAMP

This application is a continuation, of application Ser. No. 06/945,548, filed Dec. 23, 1986, now abandoned.

BACKGROUND OF THE INVENTION

I. Field of the Invention

This invention relates generally to an apparatus and related method for controlling the lighting direction of a light source. More specifically, this invention relates to an apparatus and related method for controlling the lighting direction of a vehicle headlamp which can be set to either a low beam state or a high beam state.

II. Backqround Information

As is generally known, automobiles are typically equipped with vehicle headlamps which may be switched between a low beam state and a high beam state. The switching device used to switch the headlamps between low beam and high beam states is referred to as a dimmer switch. With the recent increasing use of electronic control circuits for controlling automobile devices, it has been proposed to use such a circuit to improve the switching of headlamp lighting directions.

For example, electronic control circuitry may be used so that the dimmer switch functions merely to generate a command signal which causes a change in the lighting direction of the vehicle headlamps from the high beam state to the low beam state or vice versa. The electronic control circuit causes the headlamps to emit light in a different direction from the previous direction each time the dimmer switch is turned ON. In such a manner, the operator of an automobile, upon observing the need for a change in lighting direction may achieve the change by merely turning ON the dimmer switch, thus causing a command signal to be received by the electronic control circuit from the dimmer switch. The automobile operator need not decide which way to move the dimmer switch since the dimmer switch is turned ON to change the lighting direction from a current lighting direction, whatever it may be. The dimmer switch may be of the momentary kind, set to be turned OFF shortly after it has been turned ON.

The use of a dimmer switch merely to alternate the lighting direction of the headlamps creates an arrangement whereby the lighting direction of the headlamps, as stored by the electronic control circuit, may reside either in the low beam or high beam state when another switch, which is generally used to turn the headlamps ON and OFF, is turned OFF and then back ON. Accordingly, at the time the headlamps are turned ON, they may emit light in either the low beam or high beam state. It is not desirable, however, that the headlamps be turned ON to operate immediately in the high beam state. With apparatus as described above, the possibility exists, and it will often happen, that the operator of an automobile will put his headlamps ON in the face of oncoming automobile traffic, and that, unknown to the automobile driver and very much to the dismay of the oncoming drivers, the headlamps would have been set to emit light in the high beam direction. Oncoming drivers are very likely to be dazzled by such high beam-directed light.

That the foregoing possibility of dazzlement exists when an electronic control circuit is being used to control the dimmer switch means that the electronic control circuitry may be more fully used to simplify the use of the dimmer switch.

OBJECTS AND SUMMARY OF THE INVENTION

Accordingly, an object of the present invention is to provide an apparatus and related method for controlling the lighting direction of a vehicle headlamp, capable of emitting light in either a low beam direction or a high beam direction wherein the vehicle headlamp is made to emit light in the low beam direction whenever the vehicle headlamp is turned ON.

An additional object is to provide an apparatus which utilizes a dimmer switch for alternately changing the lighting direction of the vehicle headlamp between the low beam and the high beam directions, wherein the headlamp is placed in the low beam state whenever the light source is turned ON regardless of the setting in which the headlamp is placed by the dimmer switch before the headlamp is turned OFF.

To achieve the foregoing objects, and in accordance with the purposes of the invention as embodied and broadly described herein, there is provided, an apparatus for controlling the lighting direction of a vehicle headlamp which emits a light in either a low beam direction or a high beam direction comprising: headlamp switching means having an ON and an OFF position for causing the vehicle headlamp to emit light when in the ON position; dimmer switching means having an OFF position and an ON position into which the dimmer switch may be placed momentarily, for changing the lighting direction of the vehicle headlamp; and control means for causing the vehicle headlamp to emit light in the low beam direction when the headlamp switching means is placed in the ON position, and for changing the lighting direction of the vehicle headlamp between the low beam and high beam directions after the vehicle headlamp has been caused to emit light in the low beam direction.

The method for controlling the lighting direction of a vehicle headlamp which emits light in a low beam direction setting and a high beam direction, comprises the steps of: generating a light-headlamp signal when the vehicle headlamp is to be turned ON; generating a change-direction signal when the lighting direction of the vehicle headlamp is to be changed; generating low beam control signals in response to the generation of the lightheadlamp signal and generating an activate-change control signal in response to the generation of the change-direction signal; and turning ON the vehicle headlamp to emit light in the low beam direction in response to the generation of the low beam control signals, and changing the lighting direction of the headlamp in response to the activate-change control signal after the headlamp has been turned ON to emit light in the low beam direction.

DESCRIPTION OF THE PREFERRED EMBODIMENT

Figure 1:
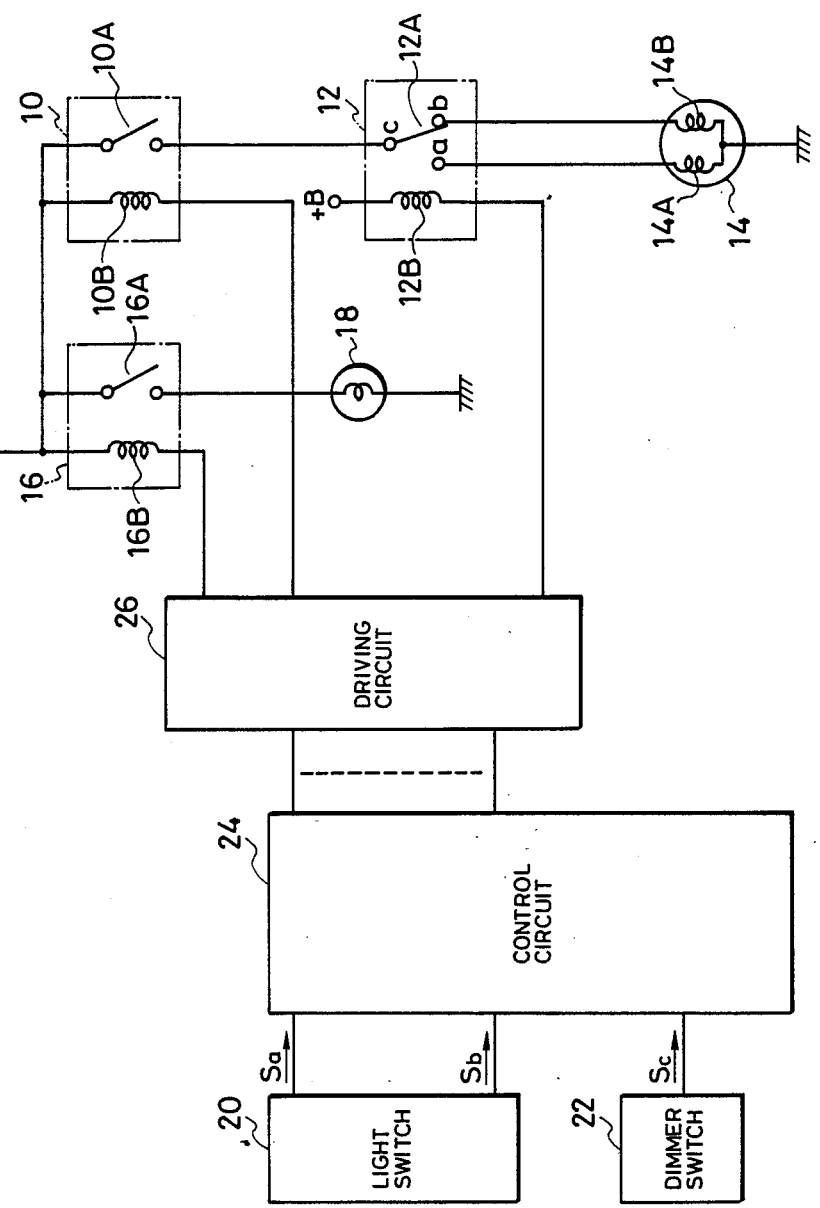
FIG. 1 is a schematic diagram of a preferred embodiment of the apparatus for controlling the lighting direction of a vehicle headlamp incorporating the teachings of the subject invention.

A first preferred embodiment of the present invention is described with reference to FIGS. 1 and 2. Referring to FIG. 1, apparatus for controlling the lighting direction of a vehicle headlamp, and the vehicle headlamp are shown. A headlamp relay 10 having a relay switch 10A, is closed when headlamp 14 is ON. An excitation coil 10B is supplied with power from a battery output terminal +B. A dimmer relay 12 is connected between headlamp relay 10 and headlamp 14. An excitation coil 12B of dimmer relay 12 is supplied with power from battery output terminal +B. Headlamp 14 includes a high beam filament 14A, and a low beam filament 14B. Filaments 14A and 14B are selectively supplied with power from output terminal +B through relay switch 10A of headlamp relay 10, and a relay switch 12A of dimmer relay 12.

Filament 14A of headlamp 14, the high beam filament, is supplied with power through contacts c and a of relay switch 12A of dimmer relay 12. The connection between contacts c and a is normally open in that automobile headlamps are most often operated in the low beam direction or state. Filament 14B of headlamp 14, the low beam filament, is supplied with power through contacts c and b of relay switch 12A. The connection between contacts c and b is normally closed for the reason stated above.

The apparatus for controlling the lightinq direction of a vehicle headlamp is connected with and part of apparatus for controlling other vehicle lamps such as tail lamps and license plate lamps. The present invention, as preferably embodied, cooperates with apparatus for controlling other vehicle lamps. A small lamp relay 16 for use in controlling other vehicle lamps is shown in FIG. 1. Small lamp relay 16 includes a relay switch 16A and an excitation coil 16B which is supplied with power from battery output terminal +B. Relay switch 16A is normally open. Vehicle lamps other than headlamp 14, including tail lamps and license plate lamps controlled by small lamp relay 16 are represented by a small lamp 18. Small lamp 18 is supplied with power through relay switch 16A when relay switch 16A is closed.

Relay switches 10A, 12A and 16A may be switched in order to open and close contacts in response to power supply changes experienced by excitation coils 10B, 12B and 16B, respectively. Accordingly, by controlling the supply of power to each of excitation coils 12B, 16B and 10B, the headlamp 14 may be turned ON or OFF, the lighting direction setting of headlamp 14 may be switched between high and low beam states, and small lamp 18 may be turned ON or OFF.

The first preferred embodiment of the present invention further includes a light switch 20. Light switch 20 is operatively connected to a control circuit 24 and a driving circuit 26. Light switch 20, control circuit 24 and driving circuit 26 control relays 12, 16 and 10 to turn headlamp 14 ON and OFF, to switch the filament setting of headlamp 14, and to turn small lamp 18 ON and OFF.

Light switch 20 may be set to output a small lamp lighting command signal Sa which operates to cause control circuit 24 to change small lamp 18 from the OFF state to the ON or SMALL state. Similarly, light switch 2 may be set to output a headlamp lighting command signal Sb which switches the headlamps from the OFF state to the ON or HEAD state.

Also shown, is a dimmer switch 22 which is a momentary switch that is turned ON momentarily when an operating lever (not shown) which is movable in a single direction is moved in that single direction. Each time the operating lever is moved, dimmer switch 22 generates a switch lighting direction command signal Sc. Command signals Sa, Sb and Sc are transferred to control circuit 24.

Control circuit 24 controls the supply of power to (and interruption of power to) excitation coils 16B, 10B, and 12B in response to the command signals received, i.e., Sa, Sb, and Sc. Control circuit 24 comprises a microprocessor which sets the ON or OFF states, and low or high beam condition of headlamps 14 and small lamp 18 according to a prestored program. Control of excitation coils 10B, 12B, and 16B of relays 10, 12, and 16, respectively, is implemented by the microprocessor through a driving circuit 26.

A microprocessor which is being used to control other vehicle devices, such as, for example, a windshield wiper, may also be used as the microprocessor comprising control circuit 24.

Figure 2:
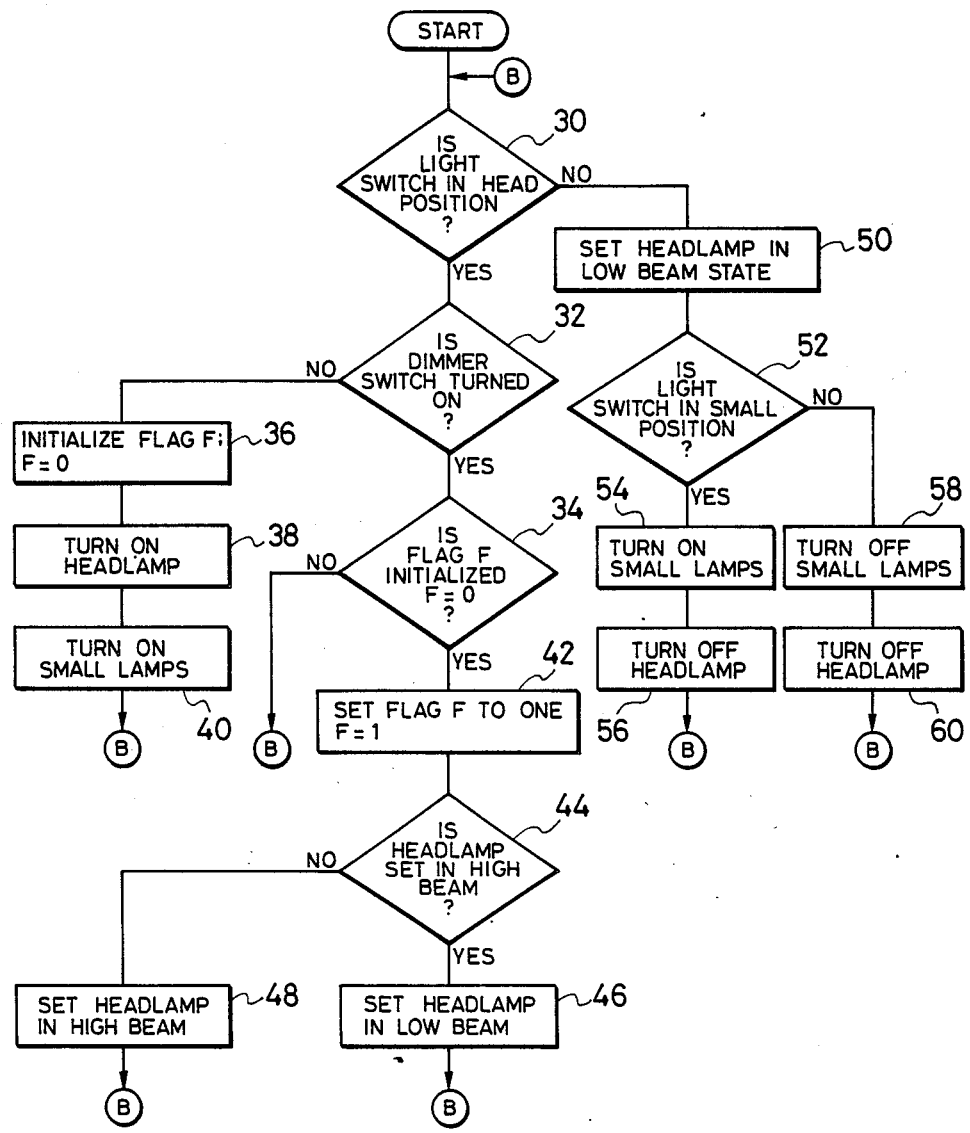
FIG. 2 is a flow diagram depicting the principal steps for controlling the lighting direction of a vehicle headlamp using the apparatus of FIG. 1.

FIG. 2 generally tracks the operation of the headlamp lighting direction control apparatus of FIG. 1, and specifically illustrates the steps performed by control circuit 24 of the apparatus for controlling the lighting direction of headlamp 14.

In a step 30 of the flow diagram, a decision is made as to whether light switch 20 of the control apparatus is in the HEAD position, as is required to send command signal Sb to control circuit 24 in order to turn ON headlamp 14. If light switch 20 is not in the HEAD position, the microprocessor comprising control circuit 24 proceeds to a step 50 of the flow diagram wherein dimmer relay 12 is made to close the low beam contacts c and b of relay switch 12A.

If light switch 20 is in the HEAD position, i.e., turned ON, the program stored in the microprocessor comprising control circuit 24 proceeds to a step 32 in which it is determined whether dimmer switch 22 has been turned ON, as is done in order to change the lighting direction of headlamp 14. Dimmer switch 22 is held in the OFF position whenever light switch 20 is moved to the HEAD position. At such a time, dimmer switch 22 is held OFF in order that dimmer switch 22 may not be used to switch headlamp 14 from the low beam filament 14B selected by control circuit 24 to the high beam filament 14A. At times when dimmer switch 22 is not held OFF and has been turned ON, command signal Sc is transferred to control circuit 24 from dimmer switch 20, and a program step 34 is executed.

The stored program advances to a step 36 at times when dimmer switch 22 has been determined to be OFF. To emphasize, dimmer switch 22 will be OFF either because light switch 20 has been just moved to the HEAD position, or because dimmer switch 22 has otherwise been reset to be in the OFF position. In step 36, control circuit 24 initializes a flag F by setting flag F to ZERO (0). Setting flag F to ZERO (0), after the determination has been made that dimmer switch 22 is not ON, signifies that headlamp 14 will be turned ON (as is done in the steps immediately following step 36) in the low beam state. The filament selection of headlamp 14 may be changed by dimmer switch 22 only when flag F is set to ONE (1). Again, in keeping with the object of the present invention, flag F is set to ONE (1) so that the headlamp filament selection may be changed using dimmer switch 22 only after flag F has been first set to ZERO (0), and headlamp 14 turned ON in the low beam state. (See step 34, described below.)

In a step 38, control circuit 24 of headlamp 14 is turned ON (or kept ON if light switch has not just been moved to the HEAD position). The filament selection of headlamp 14 at which headlamp 14 is turned ON is determined at times and in a manner depicted in a step 46, a step 48, or a step 50 of the flow diagram of FIG. 2. Whenever headlamp 14 is turned ON, small lamp 18 is also turned ON. A step 40 illustrates the fact that small lamp 18 is turned ON after headlamp 14 is turned ON. Following step 40, the microprocessor comprising control circuit 24 returns to step 30 (after executing other steps not shown) to determine whether light switch 20 is still in the HEAD position and whether dimmer switch 22 is still OFF (step 32).

As described above, step 34 is executed when it has been determined that dimmer switch 22 is ON. In step 34, a determination is made as to whether flag F has previously been set to ZERO (0). If flag F has not been set to ZERO (0) previously, the program returns to step 30 (after executing other steps not shown) until such time as flag F is set to ZERO, as in step 36. Step 34 ensures that dimmer switch 22 is not operable to change the filament of headlamp 14 until after headlamp 14 has been turned ON in the low beam state (steps 36, 38 and 40).

If flag F has previously been set to ZERO (0), the microprocessor program proceeds to a step 42 wherein flag F is set to ONE (1). Flag F thereby indicates that headlamp 14 has been initially turned on in the low beam state. Step 34 is executed each time dimmer switch 22 is turned ON. Thereafter, in a step 44, a decision is made as to whether the microprocessor was set to cause headlamp 14 to emit light in the high beam state during the most recent time in which dimmer switch 22 was operable to change the filament of headlamp 14.

If the microprocessor was set to cause headlamp 14 to emit light in the high beam state, the program proceeds to step 46, if not to step 48. The decision of step 44 is executed only once each time dimmer switch 22 is turned ON.

In step 46, the filament selection of headlamp 14 is set to be in the low beam state by control circuit 24. The selection is stored so that when step 38 is executed, control circuit 24 causes headlamp 14 to emit light of the proper direction, i.e., the contacts c and b of relay switch 12A will be closed in order that headlamp 14 may emit light in the low beam state. After step 46 has been executed, the program performs other steps, not shown, and then returns to step 30.

In step 48, the filament selection of headlamp 14 is set to be in the high beam state by control circuit 24. The selection is stored so that when step 38 is executed, control circuit 24 causes headlamp 14 to emit light of the proper direction, i.e., the contacts c and b of relay switch 12A will be closed in order that headlamp 14 may emit light in the high beam state. After step 48 has been executed, the program performs other steps, not shown, and then returns to step 30.

The procedures of steps 46 and 48 are alternately executed every time dimmer switch 22 is turned ON. Accordingly, the lighting direction of headlamp 14 is alternately switched from the current direction to the other direction each time dimmer switch is turned ON.

As described, control circuit 24 executes step 50 if light switch 20 is not set in the HEAD position. At such times, light switch 20 is either in the SMALL or OFF position. In step 50, the filament selection of headlamp 14 is set to be in the low beam state. To emphasize, any time the determination has been made that headlamp 14 has been turned OFF, or is otherwise no longer turned ON, i.e., light switch 20 is no longer in the HEAD position, control circuit 24 causes dimmer relay 12 to be set so as to emit light in the low beam state when headlamp 14 is turned ON. Control circuit 24 stores the low beam setting in step 50 and implements the low beam setting when step 38, described above, is executed.

Thereafter, step 52 is executed wherein a decision is made as to whether light switch 20 has been set in the SMALL position. If light switch 20 is in the SMALL position, the program proceeds to steps 54 and 56. If not in the SMALL position, light switch 20 is in the OFF position, and the program proceeds to steps 58 and 60.

In step 54, small lamp 18 is turned ON, and in step 56, headlamp 14 is turned OFF. Other steps, not shown, are subsequently executed and the program thereafter returns to the decision depicted in step 30 of the flow diagram.

In step 58, small lamp 18 is turned OFF, and in step 60, headlamp 14 is turned OFF. Other steps, not shown, are subsequently executed and the program thereafter returns to the decision shown in step 30 of the flow diagram.

As has been described in connection with the first preferred embodiment, the operating lever (not shown) of dimmer switch 22 can always be restored to a single position, and is used merely to cause a change in lighting direction and not to actually set a specific lighting direction. With the above-described program stored in the microprocessor, dimmer switch 22 may be used advantageously in that the lighting direction of headlamp 14 is kept in the low beam state when headlamp 14 is first turned ON regardless of the most recent lighting direction of headlamp 14 achieved using dimmer switch 22. This feature enables the present invention to achieve the aforementioned objects.

Figure 3:
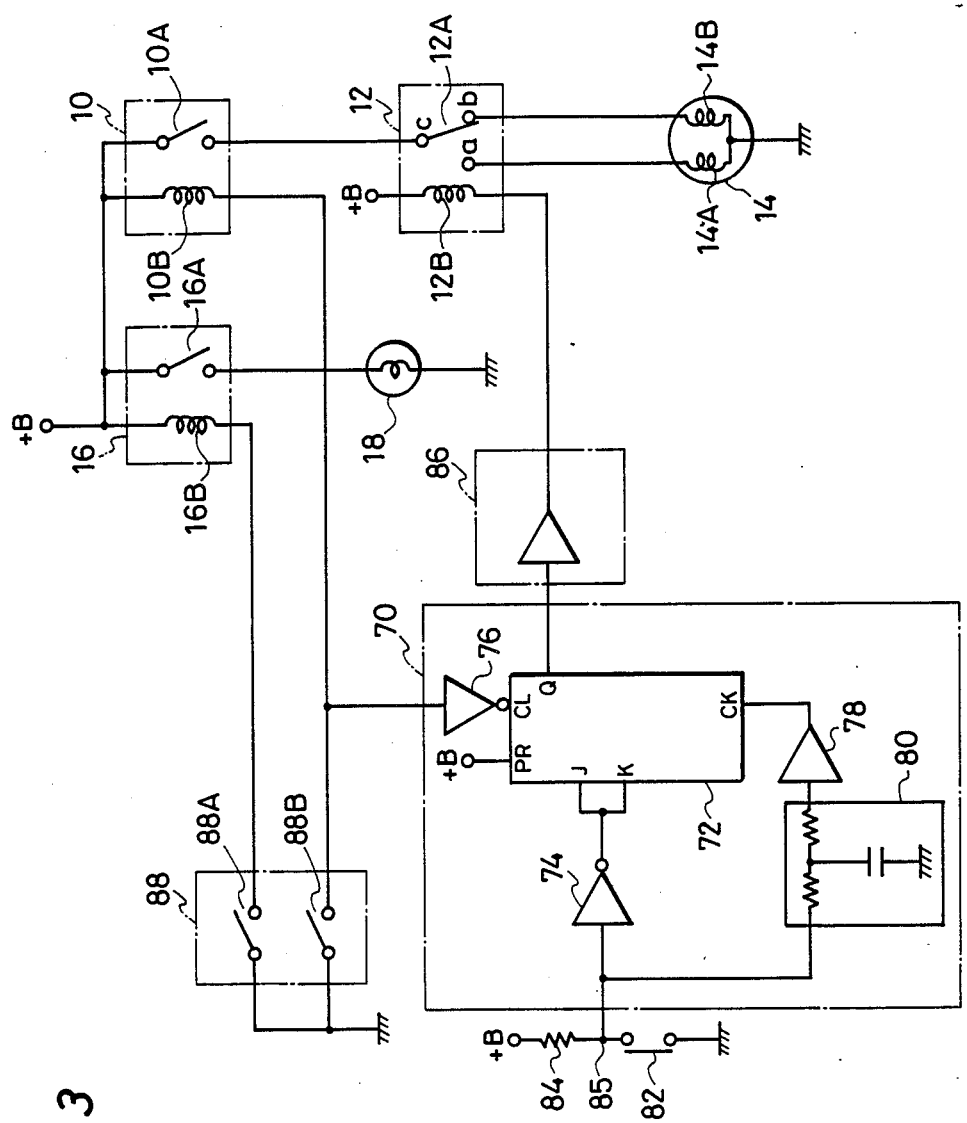
FIG. 3 is a schematic diagram of another preferred embodiment of the apparatus for controlling the light-

Another preferred embodiment of the present invention is shown in FIG. 3. The preferred embodiment shown in FIG. 3 is substantially similar to the first preferred embodiment. Accordingly, the preferred embodiment of FIG. 3 will be described below primarily in connection with the differences between the preferred embodiments.

A control circuit 70 comprises the control circuitry for turning headlamp 14 and small lamps 18 ON and OFF. Control circuit 70 essentially performs the functions performed by the microprocessor of the first embodiment.

Control circuit 70 includes a J-K flip flop 72 and inverter buffers 74 and 76 which are equipped with Schmitt trigger capability. Control circuit 70 further includes a buffer 78, also equipped with Schmitt trigger capability, a delay circuit 80, and a momentary dimmer switch 82 which operates in a manner similar to dimmer switch 22 of the first preferred embodiment described above. One end of dimmer switch 82 is connected to a battery output terminal +B through a resistor 84. Every time dimmer switch 82 is turned ON, the potential at a node common to dimmer switch 82 and resistor 84 is carried to a low-level or ground potential. Common node 85 is connected to terminals J and K of J-K flip flop 72 through inverter buffer 74, and also connected to a clock terminal CK of J-K flip flop 72 through delay circuit 86 and buffer 78.

J-K flip flop 72 is used as a toggle-type flip flop wherein the output from output terminal Q is inverted every time dimmer switch 82 is turned ON. As shown, preset terminal PR is connected to battery output terminal +B, and output terminal Q is connected to battery output terminal +B through a buffer 86 which functions as a driver to excitation coil 12B of dimmer relay 12 which is disposed between buffer 86 and excitation coil 12B.

The headlamp lighting direction control apparatus of FIG. 3 further includes a light switch 88 which turns ON small lamp 18 when light switch 88 is moved from an OFF position to a SMALL position. A small light switch 88A is closed when light switch 88 is moved to the SMALL position. Light switch 88 closes small lamp switch 88A and a headlamp switch 88B when light switch 88 is moved from the OFF or SMALL positions to the HEAD position, thereby turning ON headlamp 14. One end of each of switches 88A and 88B is grounded, and the other end of each of switches 88A and 88B is connected to battery output terminal +B through an exitation coil (excitation coil 16B of small lamp relay 16 and excitation coil 10B of head lamp relay 10, respectively).

The side of headlamp switch 88B which is connected to excitation coil 10B is connected also to clear terminal CL of J-K flip 72 through inverter buffer 76. J-K flip flop 72 is cleared when headlamp switch 88B is turned ON, thereby causing a preset signal, which is a high level signal, to be produced by J-K flip flop 72 as the output at terminal Q.

When light switch 88 is set to the SMALL position to close small lamp switch 88A, excitation coil 16B of small lamp relay 16 causes relay switch 16A to close, thus turning ON small lamps 18. When light switch 88 is set to the HEAD position to close headlamp switch 88B, excitation coil 10B of headlamp relay 10 causes relay switch 10A to close, thus turning ON headlamp 14. Headlamp 14 emits light of low or high beam according to whether contacts c and b or c and a of relay switch 12A are closed.

As described, J-K flip flop 72 is cleared when headlamp switch 88B is closed, and output terminal Q of J-K flip flop 72 outputs a high level signal. The output from terminal Q is transferred by buffer 86 to excitation coil 12B of dimmer relay 12 cutting off power to excitation coil 12B. Accordingly, dimmer relay 12 closes contacts c and b of dimmer relay 12A to cause low beam filament 14B of headlamp 14 to emit light.

When dimmer switch 82 is turned on after J-K flip flop has been cleared, the output of terminal Q of J-K flip flop 72 is inverted between the low and high level signals, alternately. Excitation coil 12B thereby alternately closes contacts c and b and c and a of relay switch 12A, to switch headlamp 14 between the low and high beam states.

Although headlamp 14 may be switched between the low and high beam states using dimmer switch 82, since J-K flip flop 72 is cleared each time head lamp switch 88B is closed, headlamp 14 will always emit light in the low beam state when headlamp 14 is turned ON.

In the foregoing description, dimmer switches 22 and 82 of the preferred embodiments shown in FIG. 1 and FIG. 3, respectively, are unidirectionally operated. Bidirectionally operated switches may be used, however.

The present invention utilizes a dimmer switch for alternating the lighting direction of a vehicle headlamp, but does so utilizing control apparatus that ensures that only low beam light is emitted by the headlamp when the headlamp is turned ON. The possibility which might be presented if oncoming traffic is suddenly met with light emitted in the high beam direction when an automobile driver turns his headlamps ON are thereby averted. In view of the preferred embodiments of the present invention described above, it should be understood that in addition to disclosure of an apparatus for controlling the lighting direction of a vehicle headlamp, a related method also has been disclosed for controlling the lighting direction of a vehicle headlamp. This method, in its generic form, may be said to comprise the steps of: generating a light-headlamp signal when the vehicle headlamp is to be turned ON; generating a change-direction signal when the lighting direction of said vehicle headlamp is to be changed; generating low beam control signals in response to the generation of said light-headlamp signal and generating an activate-change control signal in response to the generation of said change-direction signal; and turning ON the vehicle headlamp in the low beam state direction in response to the generation of the low beam control signals, and changing the lighting direction of the headlamp in response to the activate-change control signal after the headlamp has been turned ON in the low beam state.

It should be apparent to those skilled in the art that various modifications may be made to the headlamp lighting direction control apparatus and related method of the subject invention without departing from the scope or spirit of the invention. Thus, it is intended that the invention cover modifications and variations of the invention, provided they come within the scope of the appended claims and their legally entitled equivalents.

I claim:

1. An apparatus for controlling the lighting direction of a vehicle headlamp which emits light in either a low beam direction or a high beam direction, and for controlling a plurality of small lamps, comprising:

lamp switching means having an ON, an INTERMEDIATE, and an OFF position for providing a light-headlamp signal and light-small lamp signal as outputs when said headlamp switching means is in said ON position, and for providing a light-small lamp signal when said headlamp switching means is in said INTERMEDIATE position;

dimmer switching means having an ON position and an OFF position into which said dimmer switching means can be placed, for providing a change-direction signal as an output when said dimmer switching means is placed in said ON position;

lamp control means, operatively connected to said lamp switching means outputs and said dimmer switching means output for providing activate-low beam control signals in response to receipt of said light-headlamp signal, for providing an activate-small lamp control signal in response to receipt of said light-small lamp signal, and for providing an activate-change control signal in response to receipt of said change-direction signal; a microprocessor for providing said activate-low beam control signals, said activate-small lamp control signal, and said activate-change control signal in response to receipt of said light-head lamp signal, said light-small lamp signal and said change-direction signal, respectively;

a driver, interposed between said microprocessor and said relays for transferring said activate-low beam control signals, said activate-small lamp control signal, and said activate-change control signal from said microprocessor to said relays; and relay means, interposed between said lamp control means and said vehicle headlamp, and between said lamp control means and said small lamps, for turning ON said vehicle headlamp in said low beam direction in response to receipt of said activate-low beam control signal regardless of a last position of said dimmer switching means when said vehicle headlamp was OFF, for turning ON said small lamps in response to receipt of said activate-small lamp control signal, and for changing said lighting direction of said headlamp in response to said activate-change control signal only after said headlamp has been turned ON in said low beam direction.

2. An apparatus for controlling the lighting direction of a vehicle headlamp which emits light in either a low beam direction or a high beam direction and for controlling a plurality of small headlamps, comprising:

lamp switching means having an ON, an INTERMEDIATE, and an OFF position for providing a light-headlamp signal and a light-small lamp signal as outputs when said headlamp switching means is in said ON position, and for providing alight small-lamp signal when said headlamp switching means is in said INTERMEDIATE position;

dimmer switching means having an ON position and an OFF position into which said dimmer switching means can be placed, for providing a change-direction signal as an output when said dimmer switching means is placed in said ON position;

lamp control means, operatively connected to said headlamp switching means outputs and said dimmer switching means output for providing an activate-low beam control signal in response to receipt of said light-headlamp signal and for providing an activate-change control signal in response to receipt of said change-direction signal; a J-K flip flop having a PRESET input terminal, a CLEAR input terminal, a CLOCK input terminal, J and K input terminals and a Q output terminal, wherein said dimmer switching means output is connected to said J and K input terminals through a first inverting buffer, and to said CLOCK input terminal through a delay circuit and a first buffer, said lamp switching means output is connected to said J-K flip flop through a second inverting buffer, and said PRESET input terminal of said J-K flip flop is connected to a positive potential of a battery, and wherein said J-K flip flop provided said activate-low beam control signal at said Q output terminal in response to receipt of said lightheadlamp signal and provides said activate-change control signal at said Q output terminal in response to receipt of said change-direction signal; and a driver interposed between said Q output terminal of said J-K flip flop and said relays for transferring said activate-low beam control signals from said Q output terminal of J-K flip flop to said relays, wherein said driver comprises a second buffer; and relay means interposed between said lamp control means and said vehicle headlamp, and between said lamp switching means and said headlamp and said small lamps, for turning ON said vehicle headlamp only in said low beam direction in response to receipt of said light-headlamp signal and said activate-low beam control signal regardless of a last position of said dimmer switching means when said vehicle headlamp was OFF, for turning ON said small lamp in response to receipt of said light-small lamp signal, and for changing said lighting direction of said headlamp only after said headlamp has been turned on in said low beam direction in response to said activate change control signal.

3. The apparatus for controlling the lighting direction of a vehicle headlamp which emits light in either a low beam direction or a high beam direction setting, and for controlling a plurality of small lamps of claim 1 wherein said relays include:

a first relay means for closing a circuit path between a positive potential of a battery and said small lamps in response to receipt of said activate-small lamps control signal;

a second relay means and a third relay means for closing a circuit path between said positive potential of said battery and said vehicle headlamp such that headlamp is turned ON to emit light of low beam in response to receipt of said activate-low beam control signal, and said third relay means for also changing said lighting direction of said headlamp between said low and high beam directions in response to receipt of said activate-change control signal after said vehicle headlamp has been turned on to emit light of low beam.

4. The apparatus for controlling the lighting direction of a vehicle headlamp which emits light in either a low beam direction or a high beam direction, and for controlling a plurality of small lamps of claim 2 wherein said relays include:

a first relay means for closing a circuit path between a positive potential of a battery and said small lamps in response to receipt of said light-small lamps signal;

a second relay means and a third relay means for closing a circuit path between said positive potential of said battery and said vehicle head lamp such that headlamp is turned ON to emit light of low beam direction in response to receipt of said lightheadlamp signal and said activate-low beam control signal, said third relay means for also changing said lighting direction of said headlamp between said low and high beam direction in response to receipt of said activate-change control signal after said vehicle headlamp has been turned on to emit light of low beam direction.

5. The apparatus for controlling the lighting direction of a vehicle headlamp which emits light in either a low beam direction or a high beam direction setting and for controlling a plurality of small lamps of claim 3, wherein said first relay means includes a magnetic coil responsive to a signal for closing said circuit path between said positive potential of said battery, and wherein said second and third relay means include magnetic coils responsive to signals for closing said circuit path between said positive potential of said battery and vehicle headlamp.

6. The apparatus for controlling the lighting direction of a vehicle headlamp which emits light in either a low beam direction or a high beam direction setting and for controlling a plurality of small lamps of claim 4, wherein said first relay means includes a magnetic coil responsive to a signal for closing said circuit path between said positive potential of said battery, and wherein said second and third relay means include magnetic coils responsive to signals for closing said circuit path between said positive potential of said battery and vehicle headlamp.

7. A method for controlling the lighting direction of a vehicle headlamp which emits light in either a low beam direction or a high beam direction, and for controlling a plurality of small lamps, comprising the steps of:

generating a light-headlamp signal and a light-small lamp signal when said vehicle headlamp is to be turned ON, and generating a light-small lamp signal when said small lamps are to be turned ON;

generating a change-direction signal when said lighting direction of said vehicle headlamp is to be changed;

generating activate-low beam control signals in response to receipt of said light-headlamp signal, and generating an activate-small lamp control signal in response to receipt of said light-small lamp signal, and generating an activate-change control signal in response to receipt of said change-direction signal; and turning ON said vehicle headlamp in said low beam direction in response to receipt of said activate-low beam control signals regardless of any previous change-direction signals generated when said vehicle headlamp was OFF, turning ON said small lamps in response to receipt of said activate-small lamp control signal, and changing said lighting direction of said headlamp in response to said activate-change control signal only after said headlamp has been turned ON in said low beam direction.

* * * * *

UNITED STATES PATENT AND TRADEMARK OFFICE
CERTIFICATE OF CORRECTION

PATENT NO. : 4,890,037
DATED : December 26, 1989
INVENTOR(S) : Minoru Izawa, et al.

It is certified that error appears in the above-identified patent and that said Letters Patent is hereby corrected as shown below:

Claim 2, col. 9, line 28, change "alight" to --a light--;

Claim 2, col. 9, line 28, line 56, change "lightheadlamp" to --light-headlamp--.

Claim 4, col. 10, lines 44-45, change "ligh-headlamp" to --light-headlamp--.

Signed and Sealed this

Twenty-fifth Day of February, 1992

Attest:

HARRY F. MANBECK, JR.

*Attesting Officer*   *Commissioner of Patents and Trademarks*